(12) United States Patent
James et al.

(10) Patent No.: US 9,718,252 B2
(45) Date of Patent: Aug. 1, 2017

(54) PRODUCT WITH INTERNAL PASSAGES MADE OF STACKED SHEETS WITH COMPRESSIVE CASING

(71) Applicant: Siemens Energy, Inc., Orlando, FL (US)

(72) Inventors: Allister William James, Chuluota, FL (US); Gary B. Merrill, Orlando, FL (US); Iain Alasdair Fraser, Ruckersville, VA (US)

(73) Assignees: SIEMENS ENERGY, INC., Orlanda, FL (US); MIKRO SYSTEMS, INC., Charlottesville, VA (US)

(*) Notice: Subject to any disclaimer, the term of this patent is extended or adjusted under 35 U.S.C. 154(b) by 434 days.

(21) Appl. No.: 14/521,798

(22) Filed: Oct. 23, 2014

(65) Prior Publication Data
US 2015/0298425 A1 Oct. 22, 2015

Related U.S. Application Data

(62) Division of application No. 13/094,985, filed on Apr. 27, 2011, now Pat. No. 8,940,114.

(51) Int. Cl.
| | | |
|---|---|---|
| B32B 3/26 | (2006.01) | |
| B28B 1/00 | (2006.01) | |
| B32B 1/00 | (2006.01) | |
| B33Y 10/00 | (2015.01) | |

(52) U.S. Cl.
CPC ............. *B32B 3/266* (2013.01); *B28B 1/002* (2013.01); *B32B 1/00* (2013.01); *B32B 2605/00* (2013.01); *B33Y 10/00* (2014.12); *Y10T 428/249923* (2015.04)

(58) Field of Classification Search
CPC ........................................ B32B 3/266
USPC ........................................... 428/68
See application file for complete search history.

(56) References Cited

U.S. PATENT DOCUMENTS

| | | | |
|---|---|---|---|
| 3,584,972 A | 6/1971 | Bratkovich et al. | |
| 3,872,563 A | 3/1975 | Brown et al. | |
| 4,871,621 A | 10/1989 | Bagley et al. | |
| 6,048,432 A | 4/2000 | Ecer | |
| 6,709,230 B2 | 3/2004 | Morrison et al. | |
| 7,141,812 B2 | 11/2006 | Appleby et al. | |
| 7,153,096 B2 | 12/2006 | Thompson et al. | |
| 7,247,003 B2 * | 7/2007 | Burke ................... | F01D 5/147 416/229 A |
| 7,255,535 B2 | 8/2007 | Albrecht et al. | |
| 7,550,107 B2 | 6/2009 | Morrison et al. | |
| 7,686,577 B2 | 3/2010 | Morrison et al. | |

(Continued)

*Primary Examiner* — Brent O'Hern (57) ABSTRACT

A component (34A, 34B, 34C) has a core formed of a stack (25, 36) of sheets (20) of material with cutouts (22A) aligned to form passages (38) in the core. An outer casing (29) spans the stack axially (51), brackets at least parts of opposed ends of the stack, and holds the sheets together in axial compression (46). Respective cooperating elements (30, 31) on the casing and the stack may register the casing with respect to the stack. Pins (24) in some sheets may engage holes (23) in adjacent sheets to register the sheets with each other. The casing may be segmented (28A, 28B, 28C). A hoop (66) may be compressed around the segmented casing. A gas turbine fuel injector may be formed of a stack (36) with an inlet element (44) compressed (46) onto the stack by the casing (29).

13 Claims, 6 Drawing Sheets

(56) References Cited

U.S. PATENT DOCUMENTS

2005/0254942 A1 11/2005 Morrison et al.
2008/0279678 A1 11/2008 Merrill et al.

* cited by examiner

PRODUCT WITH INTERNAL PASSAGES MADE OF STACKED SHEETS WITH COMPRESSIVE CASING

This application is a division of U.S. Pat. No. 8,940,114 filed Apr. 27, 2011 and issued Jan. 27, 2015.

FIELD OF THE INVENTION

This invention relates to products with complex internal passages, including gas turbine components.

BACKGROUND OF THE INVENTION

It is difficult to manufacture components with complex internal geometries. Although precision investment casting is often used to manufacture components with internal cavities, the complexity of the passages is limited by the casting core and the ability to flow material within a mold. Intricate cores are fragile, and may not withstand the casting process. Machining of internal features is usually limited to line-of-sight processes.

There are various additive manufacturing techniques such as Direct Laser Metal Sintering (DMLS) that are capable of building components layer-by-layer from sintered powder. Although such techniques are suitable for making prototypes and for limited production, they are not economical for large scale production. Additionally, the surfaces of laser-sintered materials can be unacceptability rough.

In stacked laminate construction, a component is constructed from multiple layers of sheet or foil material. Each individual sheet can be easily machined to form cutouts. The component is then built by stacking the sheets. The sheets can be registered with the cutouts aligned to form complex internal geometries. A limitation of the stacked laminate approach is the ability to reliably bond each layer. Some materials such as superalloys Haynes® 230 and 282 that are otherwise desirable are difficult to bond into a laminated structure. This limits the choice of materials that can be used for laminated construction.

BRIEF DESCRIPTION OF THE DRAWINGS

The invention is explained in the following description in view of the drawings that show.

DETAILED DESCRIPTION OF THE INVENTION

An aspect of the invention is a product made utilizing a combination of two manufacturing technologies that together provide internal passages in materials that are difficult to fabricate. A component core is made from a series of stacked sheets or foils, and an outer casing is made using a process that compresses the casing on the core.

Figure 1:
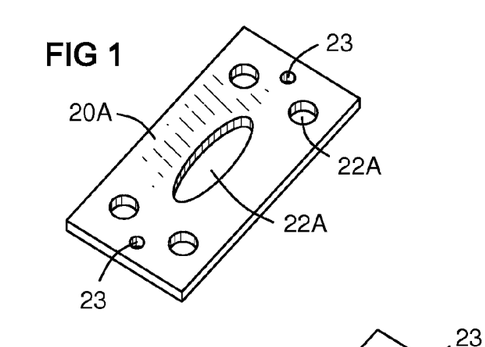
FIG. 1 is a perspective view of a first sheet of material with a pattern of holes, including two registration holes.
Figure 2:
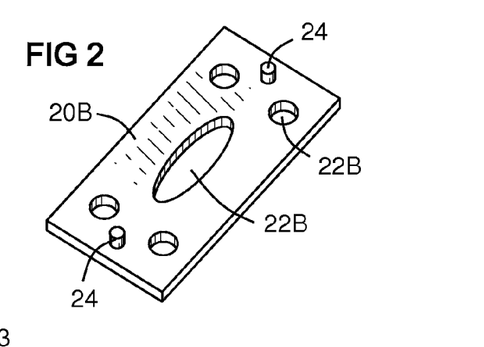
FIG. 2 is a perspective view of a second sheet of material with a pattern of holes and two registration pins.
Figure 3:
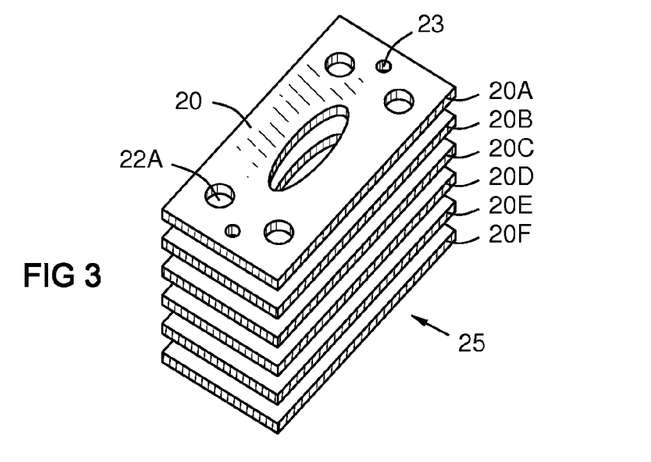
FIG. 3 shows stacking of sheets to form a stacked core structure with internal channels.

FIG. 1 shows a sheet of material 20A with cutouts 22A and registration holes 23. FIG. 2 shows a second sheet of material 20B with corresponding cutouts 22B and registration pins 24. FIG. 3 shows a stack 25 of sheets 20A-20F being assembled. The registration pins 24 fit into the registration holes 24 to register adjacent sheets so that cutouts 22A align with or overlap the corresponding cutouts 22B in adjacent sheets to define passages in the stack. Cutout patterns in each sheet may be formed using methods such as drilling/milling, laser cutting, water-jet cutting, stamping, and photochemical machining.

The registration pins 24 may be formed by molding, DMLS, or other methods. Alternately, the sheets may be registered in a jig or mold, and may be bonded together by a method such as diffusion bonding or adhesive. Alternately registration holes may be formed through every sheet in the stack 25, and long registration pins may be inserted through all the sheets.

Figure 4:
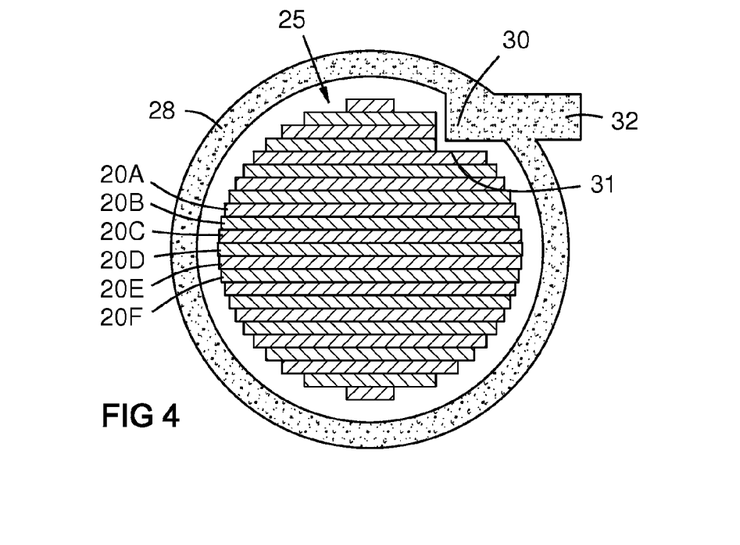
FIG. 4 shows a green-state casing preform surrounding a stacked core structure.

FIG. 4 shows a casing preform 28 that is placed or formed around a core stack 25. The casing preform may be formed of a material that shrinks during processing. In this context the phrase "shrinks during processing" does not mean simply thermal contraction. It means permanent shrinkage as measured at the same temperature before and after processing. Examples of such materials are ceramic green-bodies and sinterable metal power mixed with a binder such as a polymer. Herein, "green body" or "green state" means a preform prior to processing shrinkage. The preform may be designed and dimensioned to shrink into compression upon the stack 25 as the casing preform is processed. The preform may be manufactured by injection molding or other methods. It may have one or more registration elements 30 that mate with corresponding elements 31 on the stack; for example tongue-and-groove elements. It may have an exterior mounting element(s) 32.

Figure 5:
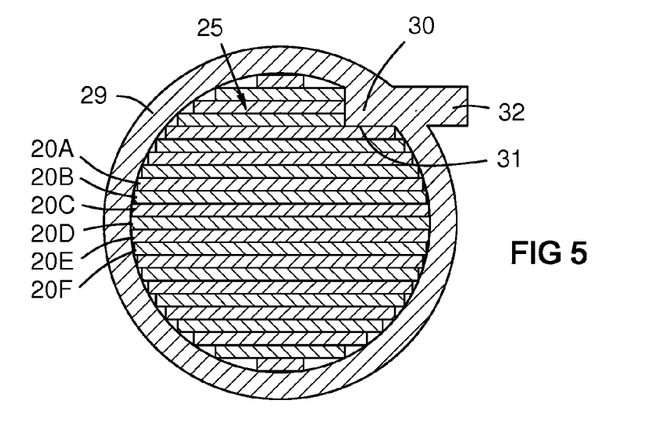
FIG. 5 shows the assembly of FIG. 4 after processing shrinkage of the casing.

FIG. 5 shows the casing 29 after processing, which reduces its volume, compressing the sheets of the core 25 together, and preventing their separation. The sheets may be bonded together or not, and may be bonded to the casing or not. Sintered metal and ceramic casings may develop a final density close to 100%. The casing may shrink up to about 20%, depending on the material. For sinterable powder materials, the shrinkage amount is largely determined by the particle constituents, their size/shape distribution, and the binder materials and proportion. These parameters may be selected in conjunction with the geometry and dimensions of the preform to produce a desired amount and distribution of compression on the sheets 20A-20F.

Figure 6:
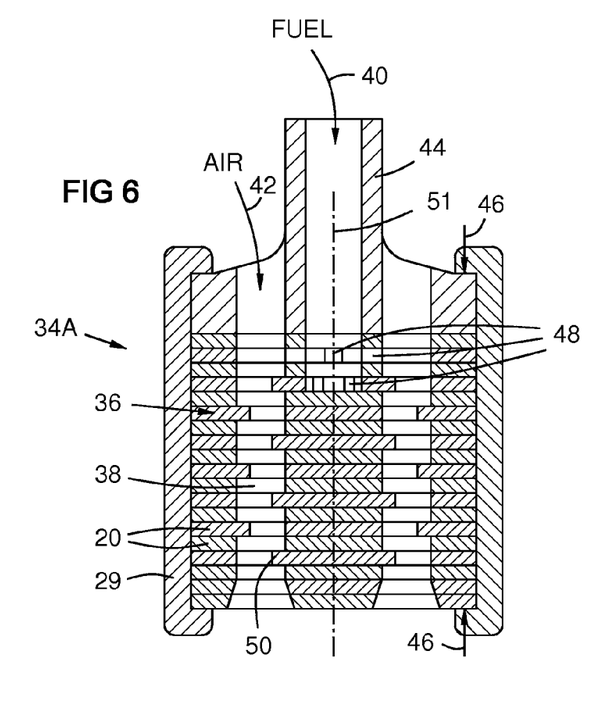
FIG. 6 shows a fuel injector formed of a stacked core and casing.

FIG. 6 shows a gas turbine fuel injector 34A made of a cylindrical stack 36 of sheets of material 20 in a casing 29. Cutouts in the sheets align to form internal passages 38 for mixing fuel 40 and air 42. A fuel and air inlet element 44 may be placed on one end of the stack. The casing 29 may span both the stack 36 and the inlet element 44 such that the casing compresses 46 the inlet element 44 against the stack 36. The inlet element 44 may be tubular as shown or other shapes, and it may be formed by any method, such as casting or molding. Fuel ports 48 may pass fuel into the mixing passages 38. Turbulators 50 may be provided in the mixing passages 38 to effectively mix the fuel and air. Stacked core structures for fuel injectors and other components may be designed in various shapes, including cylindrical, barrel-shaped, prismatic polyhedral, and irregular. An axis 51 is defined herein as a geometric central line normal to the planes of the sheets 20. It may be an axis of rotational symmetry if the stack has such symmetry, but this is not a requirement of the invention. Herein "radial" means in a direction perpendicular to such axis.

Figures 7, 8:
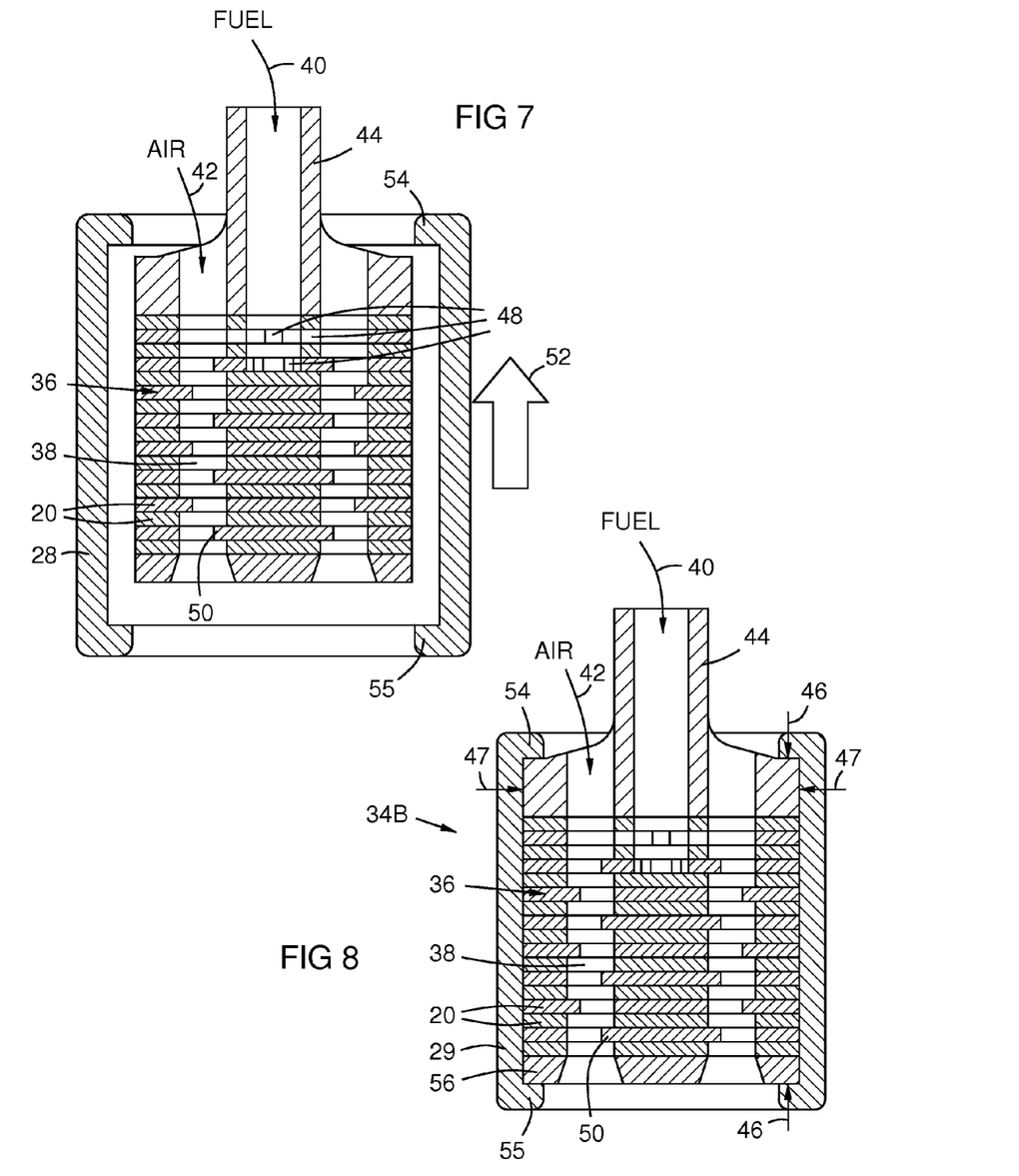
FIG. 7 shows a casing preform sliding over a stacked core structure to form a fuel injector.
FIG. 8 shows the fuel injector formed from FIG. 7, including a pressure plate.

FIG. 7 shows a geometry that allows the casing preform 28 to slide 52 over the stack 36 and the inlet element 44. Inwardly extending lips 54 on the top end of the casing preform just clear the outer diameter of the stack 36. Inwardly extending lips 55 on the bottom end of the preform are not so limited. FIG. 8 shows the resulting fuel injector 34B after about 20% shrinkage of the casing. The green body casing may be designed to shrink a given amount such as 18-20% to allow clearance for sliding assembly. The dimensions of the preform may be designed to provide a uniform or non-uniform distribution of compression stresses around the stack 36 and the inlet element 44. For example, the axial compression 46 may be greater than the radial compression 47. A pressure plate 56 may be provided to distribute axial force from the lips 55 onto the end of the stack 36. The pressure plate 56 may be for example at least twice as thick as an average sheet thickness among the sheets of the stack and may be formed of the same or a different material than the other sheets of the stack.

Figure 9:
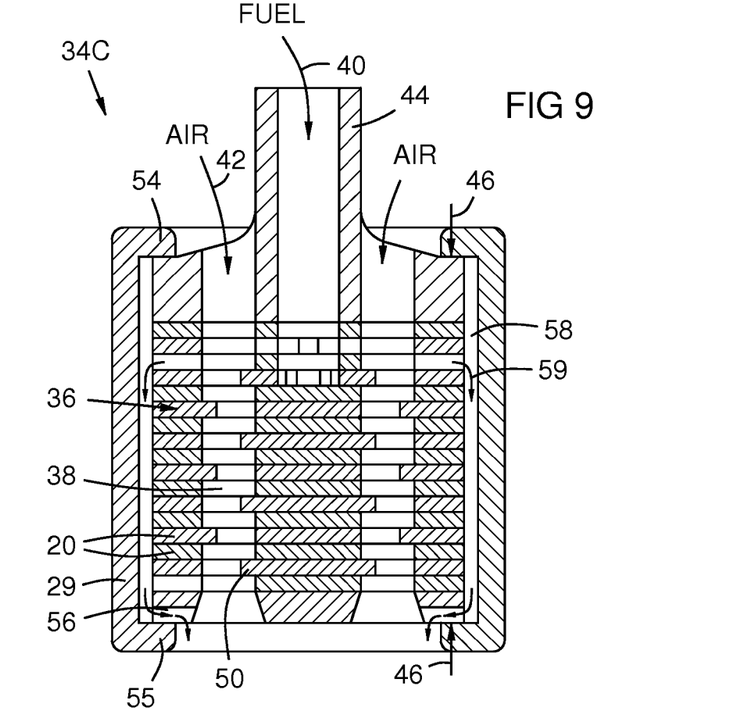
FIG. 9 shows a fuel injector with air bypass clearance between the casing and the core structure.

FIG. 9 shows a fuel injector embodiment 34C with an air bypass clearance 58 between the stack 36 and the casing 29 that allows some air 59 to bypass the mixing channels 38 to provide near-wall cooling of the casing 29 or for other purposes. In this embodiment, the casing preform may be designed with an inner diameter large enough to leave the radial clearance 58 after shrinkage. Alternately, a fugitive material may be formed on the outer diameter of the stack, and a casing preform 28 may be bi-cast over the fugitive material, which may be chemically removed after sintering and/or other processing.

Figure 10:
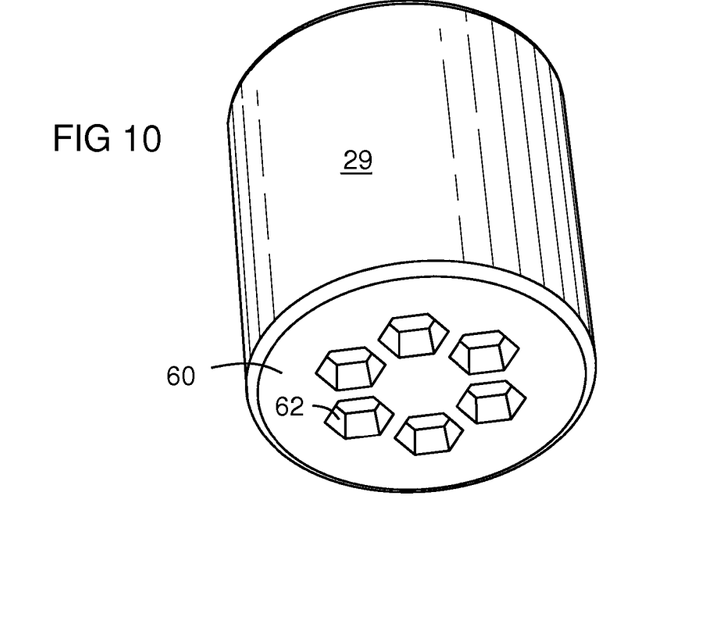
FIG. 10 shows a cup-shaped casing embodiment with outlets.

FIG. 10 shows a cup-shaped casing 29 having a bottom 60 with outlets 62. These outlets may diverge from the inside to the outside surface of the casing 29 as shown to act as diffusers, and they may have a hexagonal shape as shown. One or more circular arrays of such outlets may be provided, and they may nest in a honeycomb pattern for space efficiency. Such a cup-shaped casing in green-body form may slide over the stacked core as shown in FIG. 7.

Figure 11:
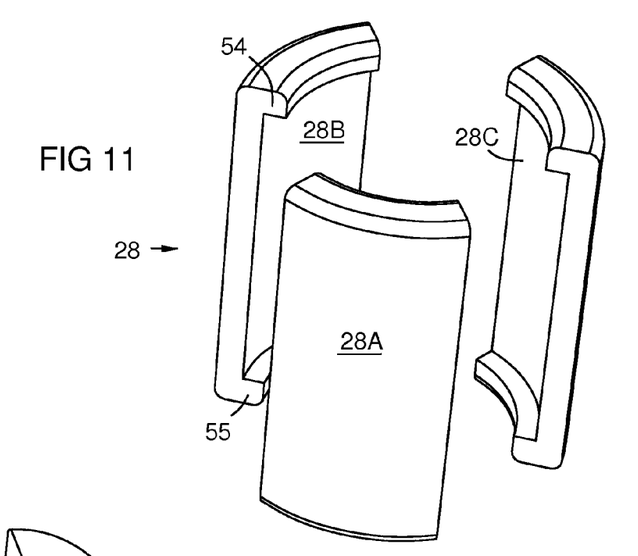
FIG. 11 shows a segmented casing embodiment.

FIG. 11 shows a segmented casing 29 with two or more segments 29A, 29B, 29C rotationally symmetrically spaced around the circumference of the stacked core. Each segment spans a portion of the core. The lips 54, 55 may extend inward as far as desired since they do not need to slide over the core as in FIG. 7. The segments may fully encircle the sides of the stacked core. However, in the example of FIG. 11, each of three segments 29A, 29B, and 29C covers 60 degrees of cylinder, leaving 60 degrees between adjacent segments.

Figure 12:
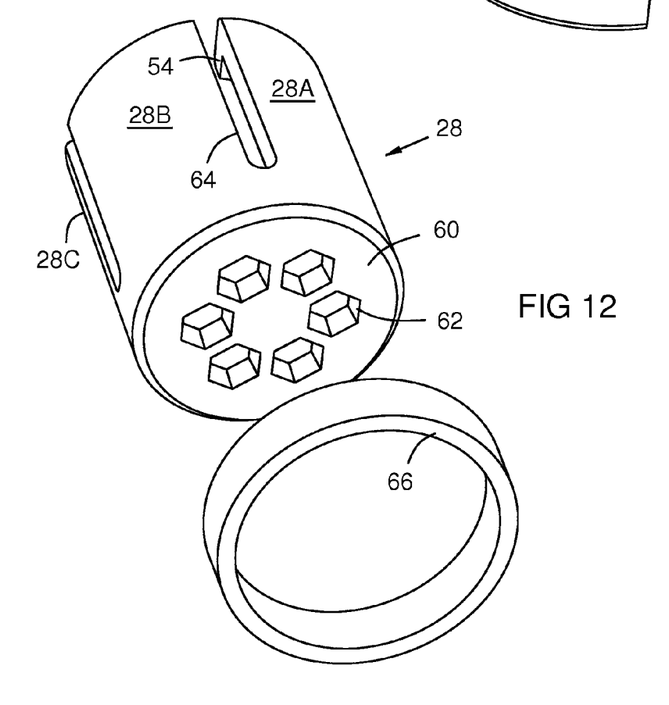
FIG. 12 shows a cup-shaped segmented casing embodiment with hoop.
Figure 13:
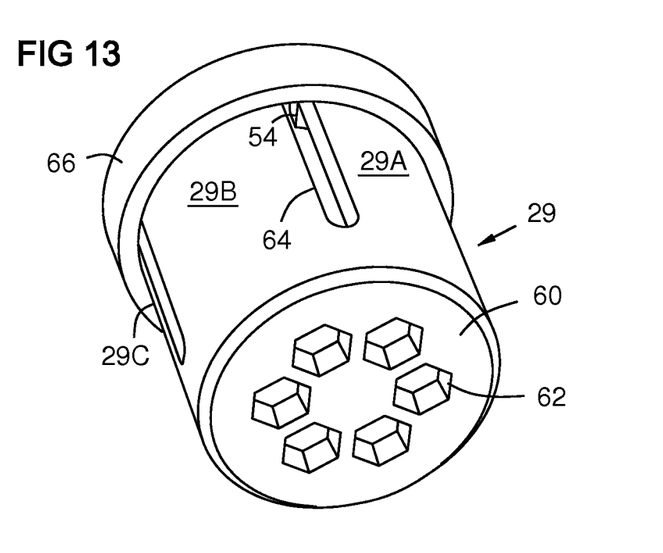
FIG. 13 shows the casing of FIG. 12 after assembly.

FIG. 12 shows a cup-shaped and segmented casing preform 28, having a bottom 60 with outlets 62 as previously described. Side segments 28A, 28B, 28C are separated by slots 64. In this example there are four side segments, one of which is hidden. It is suggested that at least 4 segments be provided in this embodiment. This preform 28 can slide over the stacked core by flexing the segments outward, which allows the lips 54 to extend further inward than with a non-flexing preform. One or more hoops 66 may be formed of a material that shrinks during processing, particularly a sinterable material, and especially the same material as the casing. The hoops may be are compressed around the casing during processing in the embodiments of FIGS. 11 and 12. Each hoop may be formed into a preform, slipped over the casing preform 28 after assembly of the preform onto the stack, and sintered with the casing or otherwise processed into compression thereon. FIG. 13 shows a hoop 66 assembled onto the casing 29.

The process herein overcomes limitations associated with poor interfacial bond strength between sheet layers. A stacked sheet core of a component is encased within an outer casing. Precise, three-dimensional features can be produced in both the stacked core and the casing preform. These features may be designed to accurately fixture the components during processing and improve dimensional tolerances. A stacked core of a component can now be made of materials that have excellent heat tolerance or other desirable characteristics, but that are not easily bonded together, such as Haynes 230 and/or 282 superalloys.

While various embodiments of the present invention have been shown and described herein, it will be obvious that such embodiments are provided by way of example only. Numerous variations, changes and substitutions may be made without departing from the invention herein. Accordingly, it is intended that the invention be limited only by the spirit and scope of the appended claims.

The invention claimed is:

1. A product, comprising:
   a stack of sheets, wherein at least some of the sheets have cutouts there through;
   the sheets stacked in a predetermined registration that aligns or overlaps at least some of the cutouts in adjacent ones of the sheets to form internal passages in the stack;
   registration pins on a first subset of the sheets;
   registration holes in a second subset of the sheets;
   wherein the registration pins are in the registration holes, registering the sheets relative to each other; and
   an outer casing that spans the stack of sheets and compresses them together.

2. The product of claim 1, wherein the sheets are bonded together, forming a stacked laminate, and the outer casing brackets at least portions of opposed ends of the stack, preventing delamination of the stack.

3. The product of claim 1, further comprising respective cooperating elements on the casing and the stack that mate and register the casing with respect to the stack.

4. The product of claim 3, wherein the cooperating elements are tongue and groove elements.

5. The product of claim 1, wherein the casing is formed of a sintered metal or a sintered ceramic.

6. The product of claim 1, further comprising a fluid inlet element on an end of the stack, wherein the outer casing spans and brackets the stack and the fluid inlet element, compressing the stack and the fluid inlet element together.

7. The product of claim 1, further comprising a pressure plate on an end of the stack, wherein the pressure plate is at least twice as thick as an average thickness of the sheets, wherein the outer casing compresses the stack and the pressure plate together.

8. The product of claim 1, wherein the outer casing is formed in at least two segments spaced symmetrically about an axis of the stack, each segment comprising inward extending lips that bracket portions of axially opposite ends of the stack.

9. The product of claim 8, further comprising a hoop around the segments of the outer casing, the hoop compressing the outer casing against sides of the stack.

10. The product of claim 1, wherein the outer casing is cup shaped with sides comprising segments, wherein each segment has an end with an inwardly extending lip, and further comprising a hoop surrounding the segments and compressing them against sides of the stack.

11. A product comprising:
a stack of sheets wherein at least some of the sheets have a respective pattern of cutouts there through;
the sheets stacked in a predetermined registration that aligns or overlaps at least some of the cutouts in adjacent ones of the sheets to form internal passages that pass through the stack;
registration pins on a first subset of the sheets;
registration holes in a second subset of the sheets;
wherein the registration pins are in the registration holes, registering the sheets relative to each other;
an outer casing that spans the stack and compresses the sheets together, preventing separation of the sheets; and
respective cooperating elements on the casing and the stack that mate and register the casing with respect to the stack.

12. The product of claim 11, wherein the cooperating elements are tongue and groove elements that engage each other between the stack and the casing.

13. The product of claim 11, wherein the stack is formed with cylindrical or barrel shaped sides and axially opposed ends, and wherein a compression by the casing on the axially opposed ends of the stack is greater than a compression by the casing on the cylindrical or barrel shaped sides of the stack.

* * * * *